Nov. 4, 1941.  W. W. BROWN  2,261,220
COMBINED COUPLING AND AUTOMATIC BRAKE
Filed Aug. 26, 1940  3 Sheets-Sheet 1
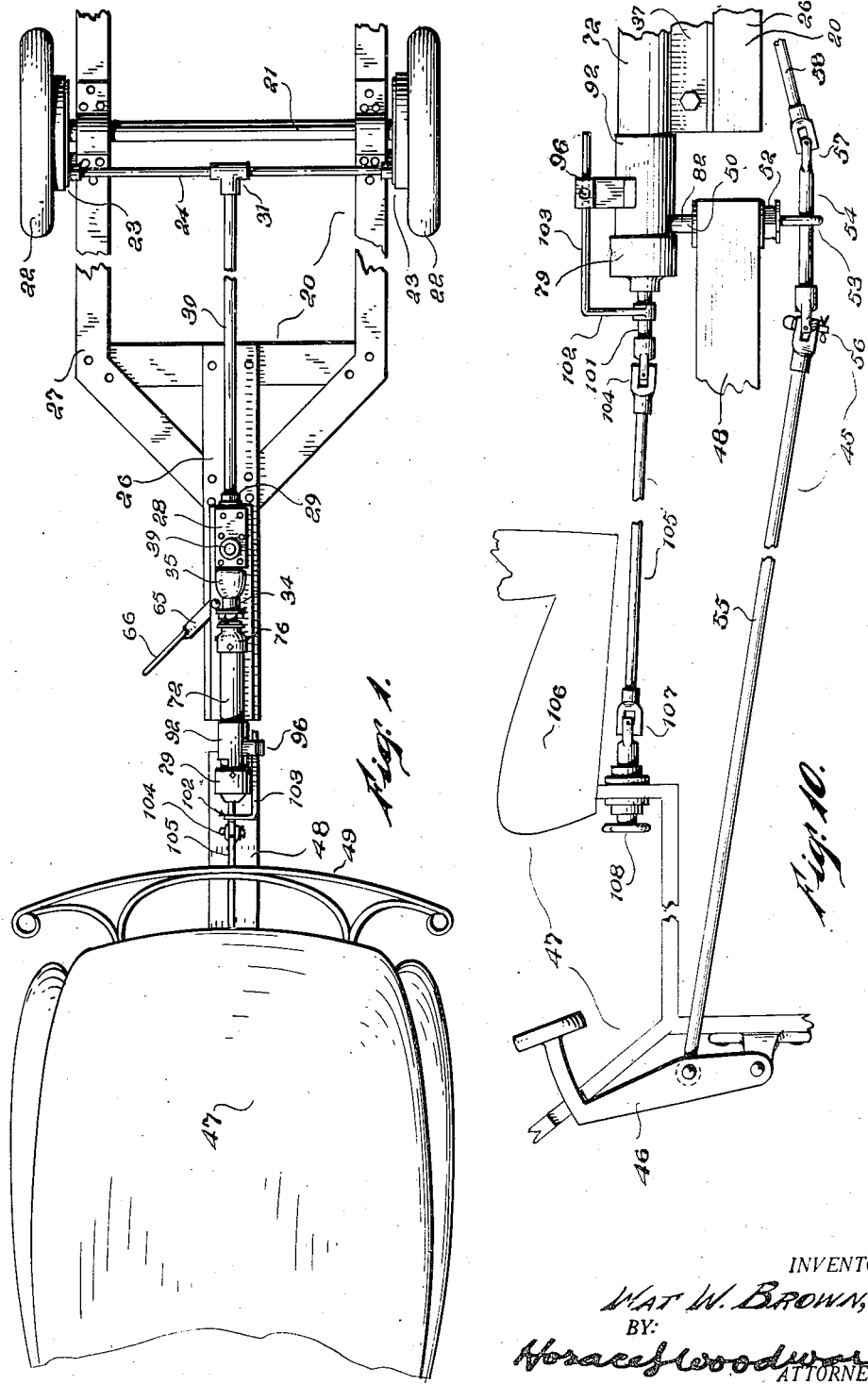
INVENTOR:
WAT W. BROWN,
BY:
Horace Woodward
ATTORNEY Nov. 4, 1941.　　　W. W. BROWN　　　2,261,220
COMBINED COUPLING AND AUTOMATIC BRAKE
Filed Aug. 26, 1940　　　3 Sheets-Sheet 2
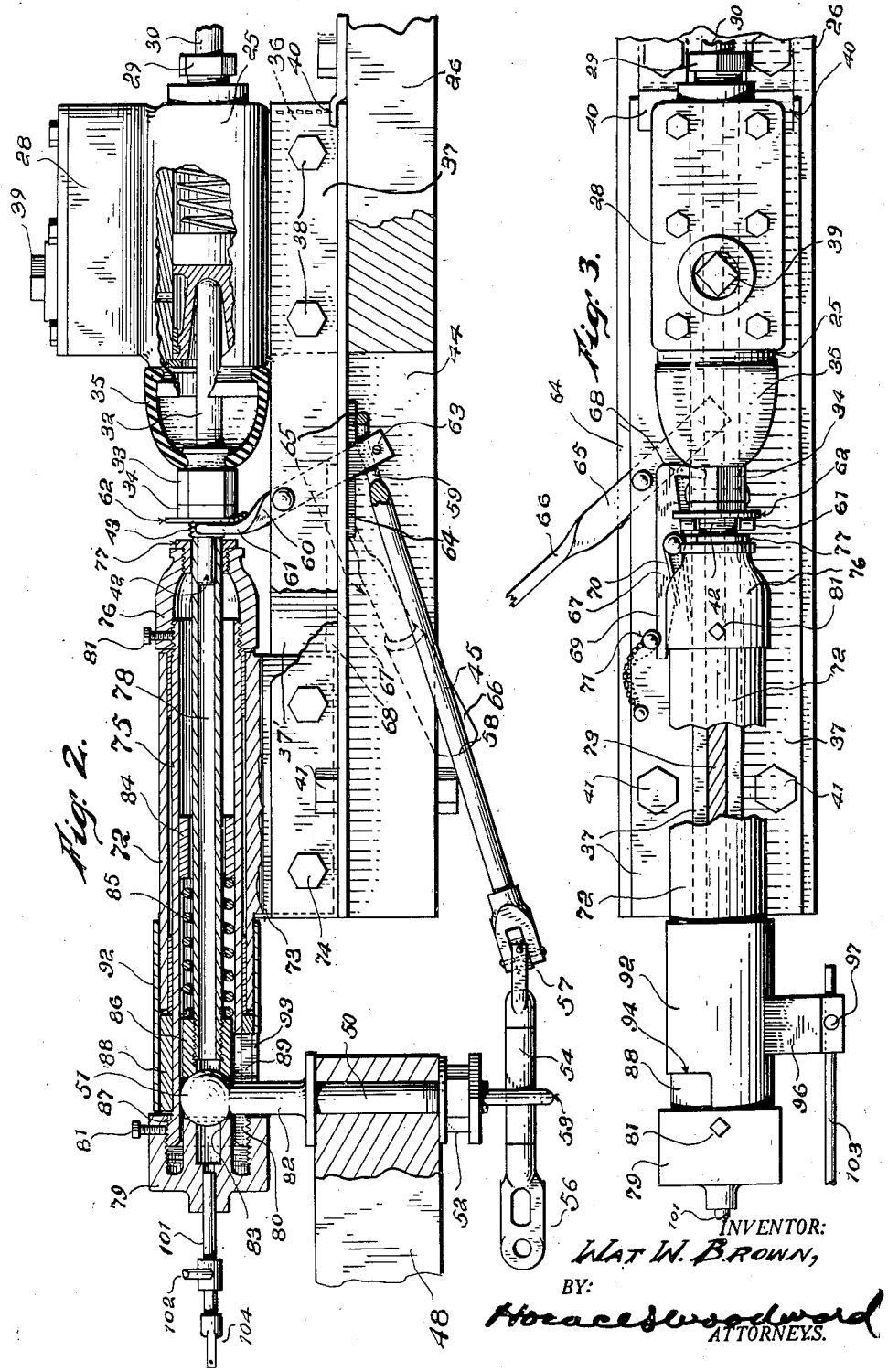
INVENTOR:
Wat W. Brown,
BY:
Horace Woodward
ATTORNEYS.

Nov. 4, 1941.     W. W. BROWN     2,261,220
COMBINED COUPLING AND AUTOMATIC BRAKE
Filed Aug. 26, 1940     3 Sheets-Sheet 3
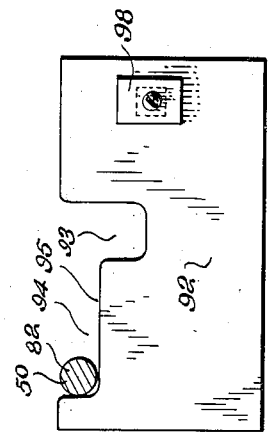
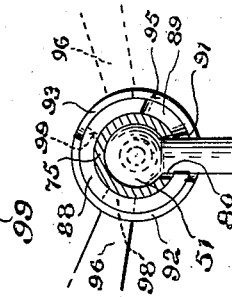
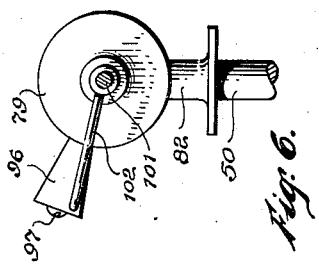
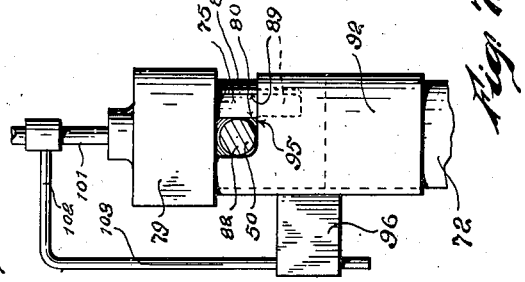
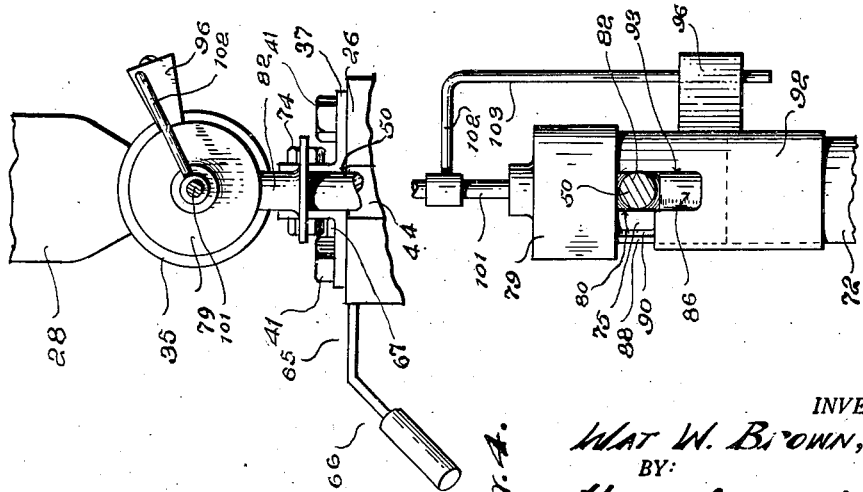
INVENTOR:
Wat W. Brown,
BY:
Horace Woodward
ATTORNEY.

Patented Nov. 4, 1941

2,261,220

UNITED STATES PATENT OFFICE 2,261,220

COMBINED COUPLING AND AUTOMATIC BRAKE

Wat W. Brown, Fort Smith, Ark.

Application August 26, 1940, Serial No. 354,315

14 Claims. (Cl. 188—112)

The invention relates to so-called "hitches" by which trailer cars or the like may be coupled onto the rear of automobiles or tractors, now very generally used for coupling so-called "trailers" onto the rear of passenger cars or automobiles, and also applicable to use as a coupling for trailers of various kinds to the rear ends of truck units, or tractor units. While the present invention is shown adapted to a trailer of the two-wheel type in which the forward end of the trailer is supported upon a draw-bar mounted upon the rear of a towing car, the invention is applicable to other forms of trailers having forward and rear trucks and not necessarily involving the placing of any substantial load additionally upon the draw-bar of the towing element. It is an important aim of the invention to provide combined coupling and automatic brake to the end of attaining new and novel functions and advantages in such devices, and particularly useful and applicable in employment to operate a hydraulic brake upon the trailer, although the invention is also adapted without material change to embodiment in trailer brake systems of other kinds as will be readily understood from the disclosure made hereinafter.

A specific aim of the invention is to preserve an arrangement wherein the trailer brake may be automatically applied without direct operation by the driver of the towing car, but responding to movements of the towing car, so as to cause automatic brake application when required. But at the same time it is an aim to present an embodiment of means of this kind which will not tend to cause application of the trailer brakes on moderate speed-control brake application on the towing car normally, yet utilizing inertia of the trailer to cause application of its brakes at proper times.

A further aim is to provide a novel means for effecting control of the brake device of the trailer to the end that when it is necessary to back the towing car—that is, to move it toward the rear—and to back the trailer at the same time, the automatic brake device of the trailer may be placed in an inoperative condition, so as not to interfere with backing movement of the two vehicle elements.

Another aim of the invention is to provide a novel means for effecting application of the brakes by direct operating connections from the towing car. A further aim is to provide a novel means for effecting the positive application of the trailer brakes and for holding it in applied position, subject to release at will of the operator.

Another aim of the invention is to present a novel mounting for the combined hitch and automatic brake for use on various types of trailer draft tongue construction, which may be quickly detached as a unit, carrying all the principal operating parts, yet which will be amply secure and effective for the uses contemplated. An important object is to provide a coupling which will utilize the ordinary upstanding ball-headed stud on the draw bar of tow cars.

Additional objects, advantages and features of invention reside in the construction, arrangement and combination of parts involved in the embodiment of the invention, as will be readily understood from the following disclosure and the accompanying drawings, wherein Figure 1 is a top plan view of a towing car and trailer chassis coupled thereto, embodying my invention.

Figure 2 is a vertical, longitudinal sectional view of the combined hitch and automatic brake unit assembly, including a part of the draw-bar of the towing car and the draft-tongue or bar of the trailer.

Figure 3 is a top view of the principal elements of Figure 2.

Figures 4 and 5 are a front elevation and a bottom view of the forward portion of the unit in position for normal brake operation.

Figures 6 and 7 are similar views showing the non-braking positions of the parts.

Figures 8 and 9 are developments of the outer and inner backing control sleeves.

Figure 10 is a lateral elevation of the operating means for the backing control means, and for direct operation of the brake device of the hitch from the towing car.

Figure 11 is a cross section of the hitch and brake unit, at the shoulder 37, looking toward the rear.

There is illustrated a trailer chassis 20, of conventional construction, having the usual fixed rear axle 21 and loose wheels 22 with respective brakes 23 of any usual construction, although a hydraulic brake is indicated in the present instance, operating fluid being conducted thereto through the pipes 24 from a brake cylinder 25 mounted on a draft tongue 26 extended forwardly from the chassis frame 27. In the present instance, the brake cylinder comprises a portion of a combined hitch and automatic brake operating unit. The cylinder 25 carries the usual brake fluid reservoir 28 integral therewith. At the rear end of the cylinder 25 there is provided any usual pipe union or coupling 29, from which the pipe 30 is extended and coupled by a T 31, with the pipes 24 leading directly to the respective brakes. Copper tubing or other suitable pipe may be used, as will be readily understood. The construction of the piston in the cylinder 25 man conform to usual practice in such master brake cylinder construction, the operating rod 32 of which extends forwardly from the cylinder, and is provided with an adjustable thrust nut and lock nut 33 and 34 of a familiar form, the thrust nut having a rear grooved portion while the forward end of the cylinder 25 is also grooved, and a dust-excluding rubber sleeve or the like 35 is engaged around the grooved parts as is familiar in couplings for master cylinders of hydraulic brake systems in automobiles. The cylinder in the present instance, is formed with a mounting flange 36, integral therewith, clamped between upstanding flanges of two angle bars 37, by means of bolts 38, the base flanges of which are bolted upon the upper side of the draft tongue 26. The reservoir 28 is provided with a filler plug 39 by which the brake fluid therein may be replenished, as required. The space between the angle bars 37 forwardly of the flange 36 is clear for a distance, affording a slot 37' as far as the mounting flange 73 of a coupling device, to be subsequently described.

The nut 33 is considerably elongated, and is fixed upon the piston rod 32, leaving a major portion of the interior of the nut adapted to receive an adjustable thrust-pin 42 which is screwed thereinto and secured by the lock nut, this thrust-pin having a thrust shoulder 43 exposed forwardly beyond the nut 34, and a reduced tenon portion extended still further and receiving an operating tube 78 thereover and against the shoulder, as will be described.

The rear ends of the angle bars 37 in the present instance stop at the rear end of the cylinder 25, but their forward parts extend a distance beyond the cylinder and thrust connections on the piston rod 32, and have mounted therebetween a mounting flange 73 arranged radially on an outer case or bearing sleeve 72, which sleeve is in effect a mount for the parts to be described in connection with the actual coupling and automatic operating means. The angle bars 37 are secured upon the tongue 26 at their rear parts by being set under hold-down plates 40 secured upon the upper side of the tongue 26 and extended forwardly so that they engage snugly over the base flanges of the angle bars. The forward ends of the angle bars are secured upon the tongue 26 by means of bolts 41. In the present instance, the tongue 26 is represented as it would appear when made of wood, but it will be understood that it may be constructed of metal, if desired. It is formed with a medial, longitudinal slot 44, extending vertically therethrough and from adjacent the forward end of the cylinder 25 to the extremity of the tongue, through which it opens. This slot is provided to accommodate brake operating linkage 45, which may be connected to a brake pedal 46, in the towing car 47, as shown in Figure 10; or otherwise connected to the regular braking system of the towing car, if desired. In the present instance, the pedal 46 is represented as a separate and independent pedal for operating the brakes upon the trailer without necessarily operating the brake of the towing car.

The connection with the towing car in the present instance includes a draw-bar 48, which may be fixed rigidly on the towing car 47, and projects rearwardly a distance from the body of the car, in the present instance being shown extended beyond the bumper 49, which is shown conventionally. On the extremity of the draw-bar 48, a hitch 50 is fixed, including a stud pin 82 extending upwardly and having a ball 51 thereon. The pin is extended downwardly through the draw-bar 48 and secured by a nut as at 52, at the lower side of the draw-bar, and in the present instance, a hanger eye 53 is mounted and fixed on the lower end of the pin, extending downwardly and arranged transversely with respect to the bar 48. In this eye there is rested an intermediate short link 54 in the connection between the pedal 46 and the brake device. To the forward end of the link 54 a long link 55 is attached by a universal joint 56, and the forward end of the link 55 is attached to the pedal 46. The rear end of the link 54 is connected by a universal joint 57 to a link 58 which is extended upwardly and rearwardly into the slot 44. The link 58 is provided at its rear end with an elongated eye 59 receiving therethrough the lower arm of a short lever 60 of the first order, the upper arm of which is extended upwardly and bifurcated as at 61, so as to pass on each side of the larger part of the pin 42, a thrust washer 62 being interposed between this fork 61 and the lock nut 34, if desired. The lower end of the lever 60 has a retaining pin 63 engaged therethrough, upon which the eye portion 59 may rest. This eye portion is curved slightly downward toward the rear part, so as to afford a clearance thereover adjacent the base flanges of the angle bar 37. In initial position the lower arm of the lever 60 extends rearwardly from its pivot, the brake being in released position, and the nut 34 and disc 62 being closely adjacent or against the rear side of the fork 61 of the lever. The pivot of the lever 60 is located rearwardly of the fork 61 when in said initial position, as illustrated in Figure 2. Beneath the angle bar 37 at one side of the slot 44, and adjacent the path of the lower arm of the lever 60, the upper side of the tongue 26 is relieved, as at 64, and on the under side of the base flange of the adjacent angle bar a hand lever 65 is pivoted, this being also of the first order and having an arm extended behind the lower arm of the lever 60, its pivot being forwardly of the normal initial and release position of the lower arm of the lever 60, and the operating handle 66 of the lever 65 being extended then forwardly, so that by rearward manual pressure thereon the inner arm of the lever 65 will force the lower arm of the lever 60 forwardly and cause application movement of the piston in the cylinder 25. The downward curvature of the eye portion 59 affords clearance thereover at all times, for operation of the lever 65 over the eye. Pivoted on the upper side of the same flange upon which the lever 65 is pivoted, there is a detent 67, which is a lever of the first order, having a rearwardly extended arm formed with a jaw 68 directed inwardly, the upstanding flange of the angle iron 37 being slotted to permit it to pass inwardly therethrough. This jaw is located adjacent the forward or released position of the lower arm of the lever 60, so that the jaw may rest against the side of the lever 60 when in released position, but may pass rearwardly of that arm when the brake is applied by hand lever 65 or through the linkage 45. The detent is provided with a forwardly extended arm 69 engaged with which there is one arm of a torsion spring 70, the other arm of which bears against the side of the adjacent angle bar tending to force the arm 69 outwardly, and so tending to move the detent 67 into engaged position. The parts are so proportioned and located that when the lever 60 is in released position, the inner end of the jaw 68 rests thereagainst and is held in disengaged position. By means of a pin 71 inserted removably through the base of the angle iron 37 immediately outward of the retracted position of the arm 69 of the detent, the detent may be secured in inoperative position when desired, removal of the pin 71 permitting the detent to function as described.

Between the forward parts of the angle bars 37 the combined hitch and brake operating means is mounted, consisting of the horizontal outer casing and bearing sleeve 72, having an integral or attached flange portion 73 extended downwardly and clamped between the angle bars 37 by means of bolts 74, or otherwise secured thereto. Revoluble in the sleeve 72 there is a draft tube 75 having a cap 76 screwed onto its rear end, provided with a bushing 77 supporting slidably an operating tube 78 which receives in its rear end the tenon portion of the pin 42 and abutting the shoulder 43 thereof, as shown. The sleeve 72 projects beyond the end of the tongue 26 a distance, and the tube 75 is projected forwardly beyond the end of the sleeve 72 a still further distance, and has screwed thereon and fixed in place thereon a front cap member 79. The caps 76 and 79 are secured removably in place by means of set screws 81. The interior diameter of the tube 75 corresponds to the diameter of the ball 51, and the tube is slotted as at 80 on the lower side through the forward end and a distance rearwardly beyond the cap 79 so as to receive the stud portion 82 of the coupling pin 50 for the necessary longitudinal sliding movement of the ball therein in performance of the function hereinafter described. The cap 79 is finished with a planiform inner end face which serves as a forward stop of the stud 82, and in addition, the cap is formed with a spherical seat 83, projected rearwardly therein so as to engage the ball 51 and support the same at its forward limit of movement relatively to the tube 75. At a suitable point in the tube 75, an annular seat 84 is fixed within the tube, receiving the operating tube 70 loosely therethrough, and against this seat 84 at its forward side, there is seated a protractile helical spring 85, the forward end of which is confined by a seat bushing 86, which is fixed on the forward end of the operating tube 78, and finished with a spherical seat at its forward end, engaged against the ball 51, in opposition to the seat 83 before mentioned, being so held by the spring 85. This spring 85 is also of sufficient strength to resist rearward movement of the ball 51 within the tube 75 except by a predetermined maximum force exerted through the tongue 26 and sleeve 72 and transmitted to the cap 79, as will be explained. The tube 75 is formed with a thickened part screwed into the cap 79, which affords a thrust shoulder 87 with which the rear edge of the cap 79 is aligned, or it may stop forwardly thereof, if desired. Between this shoulder and the forward end of the sleeve 72, there is engaged a brake control sleeve 88, which is formed with a slot 89 therein opening through its forward edge and extended rearwardly at one part with a width and dimension corresponding to the portion of the slot 80 rearwardly of the shoulder 87. This slot 89 is formed with a lateral clockwise extension 90 at its forward part, forming a shoulder 91, which is adapted to pass rearwardly of the stud 82 as in Figure 11, when the sleeve 88 is rotated counter-clockwise so as to bring the shoulder behind the stud 82 when the stud is at the forward limit of its movement with respect to the tube 75. The sleeve 88 is of a thickness to equal the combined thickness of the sleeve 72 and the bushing in the latter around the tube 75, so that the outer surfaces of the sleeve 88 and sleeve 72 are of the same diameter. The sleeve 88 serves as a spacer between the sleeve 72 and the cap 79—so that the sleeve 72 is held closely adjacent the cap 76, yet permitting free rotation of each of the sleeves on the tube 75 and relatively thereto, and with respect to each other. An outer operating sleeve 92 is snugly revoluble over the sleeves 72 and 88, covering the forward end portion of the tube 72 for a short distance, and extending to the cap 79. The sleeve 92 may be of much thinner material than the sleeve 88, and is so shown. It has a slot 93 therein of a longitudinal dimension the same as that of the slot 89 of the sleeve 88, and of corresponding width and this slot is also formed with a lateral extension 94 in the same direction as the extension 91 of the slot 89, but of much greater extent— that is to say, circumferentially—than the extension 91 in a degree which will be subsequently explained. This extension forms a shoulder 95, which is spaced sufficiently from the shoulder 87 of the tube 75 to completely clear the stud 82 at all times, being distinct in this respect from the shoulder 91 which may be spaced less from the shoulder 87, as the shoulder 91 is intended to serve as a stop for the stud 82 at times, and sustain the thrust of the load of the trailer transmitted through the sleeve 88.

In the normal operative position of the sleeves 88 and 92 the slot portions 89 and 93 are alined with each other and in line with the slot 80 and stud 82, so as to permit rearward movement of the stud into these slot portions as occasion may arise. With the parts in this normal, and what may be termed free braking position, it will be noted that a weighted knob or hand lever 96 fixed on the sleeve 92 is extended from the right hand side of the sleeve 92 at an angle slightly above the horizontal, as viewed from the front, and as shown in Figures 4 and 5. The knob 96 is secured in place upon the sleeve 92 by means of a screw or bolt 97 engaged therethrough from its outer end radially through the sleeve, and in a nut or block element 98 fixed on the inner side of the sleeve 92, either by means of the screw 97 or otherwise. To accommodate the block 98, the sleeve 88 is formed with a recess or slot 99 in its rear edge portion, extending over a radius of approximately 110 degrees in addition to the circumferential extent of the block 98, the block 98 being freely movable in the recess slot 99 when the sleeve 92 is rotated relatively to the sleeve 88 so as to tend to move the block 98 from one end of the slot 99 toward the other. As will be understood, the block is engaged against one end of the slot, (the right hand end) when the parts are in normal free braking relation as in Figures 4 and 5, and as viewed from the front, tending to hold the sleeve 88 in position with its slot portion 89 alined with the stud 82 by reason of the action of gravity on the weighted knob 96. When it is desired to move the sleeve 88 to a checking position or non-braking position, the knob 96 is moved counter-clockwise, and in the first part of this movement the sleeve 88 will tend to remain in normal position, until the block 98 engages the opposite end of the slot 99 at the left, when the two sleeves will be rotated together until the portion 90 of the slot 89 is moved so as to receive the stud 82 therein with the shoulder 91 interposed behind the stud. The movement of the two parts will then be checked by engagement of the lateral termination 100 of the slot extension 90. In the first part of the movement of the knob 96 from normal or free-braking position, it will have moved upwardly and to the left beyond the vertical radius of its axis of rotation and will have passed some distance therebeyond, before the block 98 will have engaged the far end of the slot 99 in this direction of movement, and movement thereof and of the sleeve 92 with the sleeve 98 will then continue over a further arc or radius of approximately 30 degrees, so that when the knob 96 comes to rest at the non-braking position, as shown in Figures 6 and 7, with the shoulder 91 interposed behind the stud 82, the knob 96 will extend toward the left on a radius only slightly above the horizontal, so that gravity will exert a maximum effect thereon to hold the parts in non-braking position. In the movement of the parts from non-braking to normal or free braking position again, a corresponding action occurs, so that at either limit of its movement, the knob 96 will be in the position to most effectively hold the sleeve 88 in proper position as moved by manual operation of the knob, by action of gravity on the mass of the knob 96.

In order to permit operation of the knob 96 for control of braking action of the device without requiring the operator to leave the driver's seat, I have shown a rod 101 slidably mounted in the cap 79, and provided with a radial arm 102 with a rearward rectilinear extension 103 parallel to the axis of the rod 101, and engaged slidably through the knob 96 and projecting rearwardly thereof a short distance. The forward end of the rod is connected by a universal joint 104 with a revoluble operating shaft 105, which would normally extend under the floor of a baggage compartment in passenger cars as now constructed, should such car be used as the tow car, this floor arrangement not being illustrated, however, as being no novel part of the invention. The shaft 105 extends beneath the driver's seat 106, where it is connected by a universal joint 107 to an operating knob 108, revolubly mounted near the floor conveniently to the seat 106, so that manual rotation of the knob 108 will turn the rod 101, swinging the arm 102—103 so as to move the knob 96 in the desired direction.

The operation

The parts being assembled as described, in the use of the appliance it will be readily appreciated, that when the trailer including the chassis 20 is coupled to the towing car 47, as indicated, if the regular brakes of the towing car 47 are applied, the inertia of the following trailer will cause it to press forwardly, and through the sleeve 72 this force will be transmitted to the sleeve 88 and then to the shoulder 87, whereby the tube 76 is subjected to tension tending to draw it forwardly, forcing the seat 84 against the spring 85. The latter thrusts the seat 86 against the ball 51, but is opposed by resistance of the ball. Forward movement of the tube 76 is opposed by the spring reacting against the seat 86 upon which the ball 51 presses. In normal slight application of the brakes of the towing car there will be initially no functioning of the braking system of the trailer disclosed. However, when the inertia of the trailer is sufficient to overcome the spring 85, the tube 76 will be moved forwardly, the ball 51 compressing the spring through the intermediary of the seat 86, and the latter will press the operating rod 78 rearwardly, moving the pin 42 and the piston rod 32, so as to compress the fluid in the cylinder 25, which, transmitted through the pipes 30 and 24 to the brakes 23 will effect braking action on the wheels 22 of the trailer. In this movement, the rod 101 slides rearwardly in the cap 79 a short distance and the maximum braking action is permissible without the rod 101 striking the ball 51. The bore by which the rod 101 is mounted in the cap 79 is shown as extending rearwardly to the ball, this bore being enlarged next the ball so that grease may be accommodated therein and reciprocation of the rod 101 will effect discharge of lubricant around the ball, maintaining proper lubrication of the surfaces thereof.

It will be seen that the stud 82 engaging in the slots 80, 89 and 93, and particularly in the slot 80, will prevent relative rotation of the tube 76 and assembled parts excepting the sleeve 72 relatively to the towing car on a horizontal axis, but the sleeve 72 is free at all times to rotate, and this being the only part that is fixed to the draft-tongue 26 of the trailer with respect to rotatory movement of the axis of the device, in case the trailer and the tow-car rest upon surfaces having different angles to the horizontal, transversely of the path of the vehicle, there will be no torsion strain upon the hitch or its associated operative parts tending to damage them by reason of such relative rotation from a normal position where both the trailer and the towing car rest upon the surfaces in a common plane. The universal joints in the linkage 45 also contribute similarly to save these parts from injury by such movements as last mentioned, and in addition, the link 54 is so supported in the eye 53 that it may have rocking movements around a transverse axis in all directions in case of forward thrust of the link 58. Likewise, the universal joints included in the linkage 45 obviate the liability of interference with brake action or conditions incident to sharp turning of the vehicle when their longitudinal axes are at considerable angles to each other.

An important advantage of the invention lies in the fact that in the event of breakage of the stud 82 the weight of the tongue 26 will fall upon the link 58, and bearing down of this upon the link 54 will swing the latter pivotally downwardly, the reaction thereof upon the link 58 causing the latter to be drawn forward and effecting an automatic application of the brakes before breakage of the linkage 45, the latch or detent device 67 effecting a locking of the brakes then in applied position, so that subsequent breakage of the linkage 45 will not cause the release of the brakes. There is a further element of automatic safety application and emergency application involved by the position of the lever 65 with its handle portion 66 extended downwardly so that in case of breakage of the hitch and dropping of the tongue 25 upon the ground, the lever 65 will be forced rearwardly by frictional engagement with the ground surface, causing an automatic application of the brake, which will then be locked as before mentioned by the latch device 67. It will be readily apparent that the control knob 96 may be operated manually by a person standing beside the towing car and trailer, by reaching between the two, as well as operated in safety from the seat of the operator in the towing car. When it is desired to back the towing car and trailer, the knob 96 is moved counter-clockwise to the position shown in Figures 6 and 7, which will prevent application of the brake as the draw-bar of the car moves rearwardly, tending to press the ball 51 against the seat member 86 on the operating rod 78, this movement being opposed by the shoulder 91 of the sleeve 88, so that the entire thrust is transmitted to the sleeve 72 and tongue 26 without movement of the operating rod 78.

When a stop is made, in case it is desired to apply the brakes on the trailer for uncoupling, the lever 66 is operated with the latch and detent 67 free to operate, this effecting application and retention of the brake applied while uncoupling is effected.

In order to effect the uncoupling of a trailer whereon my invention is used, it is only necessary to remove the set screw 81 from the forward cap 79, and unscrew the latter from the tube end 75, and remove a pin from one of the pivots of the universal joint 56 in the brake linkage 45. The tongue 26 being properly supported, independently of the draw-bar 28, the towing car may then be drawn forwardly, the ball 51 and stud 82 of the coupling pin being free to move out of the tube 72 and sleeves 88 and 92 without interference. At the same time the link 54 will draw through the eye 53, leaving the towing car clear of all parts on the trailer, and without unsightly elements retained upon the trailer car. The cap 79 may be drawn from the rod 101 and replaced upon the tube 72, or by providing a detachable coupling in the universal joint 104, the rod 101 may be retained with the cap upon the trailer assembly after the towing car has been coupled as first mentioned.

It will be appreciated that the rear cap 76 on the tube 75 affords a shoulder at its forward part adjacent the sleeve 72, and in the towing with a vehicle equipped with this invention, the draft force applied to the stud 82 and ball 51 are transmitted by the tube 75 to the cap 76, which in turn abuts the sleeve 72 by which the towing force is transmitted to the trailing vehicle through the tongue 26.

It will be noted that in the automatic functioning of my invention application of the brake never causes or results in operation of the latch or detent, and the brakes never become locked in applied position except on an emergency application through the foot pedal of the tow car, of manual or ground-engaging operation of the lever 65.

In case of failure of the automatic functioning features of the invention, the foot brake 46 may be used without locking by use of the pin 71 to hold the detent inoperative. The connections 45 from the pedal 46 are specially useful as a "mountain brake," where it is often desirable to apply more braking power to the rear vehicle than to the leading one. The use of the "mountain brake" is especially valuable in preventing skidding of the rear vehicle when descending steep grades, and on turns when braking is required.

It is important to note that at all times the brake may be operated for an emergency application, even if the arm 96 should be swung to non-braking position. Consequently, at any time that need arises for braking the trailer vehicle while the automatic device is in non-braking position, it is not necessary to first operate the arm 96 to braking position, but braking may be immediately effected by operation of the pedal 46, at any time.

The control of the trailer brake by the foot pedal 46 will also be valuable when an emergency stop is required on level ground, as heavily loaded trailers have often skidded laterally and then swung forwardly across traffic when a severe brake application has been made in the towing unit. Accidents and serious property damage and death have resulted from such results of functioning of prior brakes. When vehicles are operated upon icy pavements there is much greater likelihood of such accidents, and they may be largely minimized by the use of my invention as described.

It should be understood that the description of the specific embodiment of the invention herein disclosed is purely exemplary, and that various modifications of construction, arrangement and combination of parts, substitution of equivalents and variation of proportions, as well as other changes, may be made without departing from the spirit of the invention as set forth in the following claims.

While the invention in its present embodiment is principally useful in coupling land vehicles such as automobiles and trailers, operating upon pavements and roads, it is also applicable to use as a coupler for railway rolling stock, and may be found specially valuable in systems where it is not desired to use a train pipe and where ordinary simple linkages are unsatisfactory. In a train, the use of my coupler between each two units eliminates the objectionable shock to track or bridge structures due to simultaneous application of all brakes, the brakes in a system using my device being applied in succession so that a certain progression of trailing cars is permitted while inertia of leading cars is partly overcome. This reduces the shock of a train stoppage, materially.

Other forms of ball and socket construction may be employed if desired, and adaptation of rapid assembly or coupling means in the device may be effected as discretion may dictate.

I claim:

1. In a coupling of the character described, a forward draft member and a rearward draft member, one having a ball-headed stud thereon and the other having a connecting tube member engaged slidably over the ball and having a narrow slot therein open on one end of the tube to receive the stud slidably therein, said connecting member being revoluble on a horizontal axis longitudinally of the respective draft member, a bearing for said tube on the respective draft member, and a removable cap on the end of the tube across the said slot.

2. The structure of claim 1, the said cap having a spherical seat therein to engage the ball, a journal bearing for said tube on the respective draft member, a brake-operating member slidable in the tube and having a forward spherical seat element engaged with the ball opposite the first named seat, a brake system and operative connections between the brake system and said brake-operating member.

3. The structure of claim 1, the said cap having a spherical seat therein to engage the ball, a journal bearing for said tube on the respective draft member, a brake-operating member slidable in the tube and having a forward spherical seat element engaged with the ball opposite the first named seat, a brake system and operative connections between the brake system and said brake-operating member, a seat in said tube spaced from the seat on said operating member, and a helical thrust-sustaining spring in the tube confined between said last named two seats.

4. The structure of claim 1 said tube having thrust shoulders at each end and adapted to receive said ball loosely therein, a forward seat member on the tube and an operating member rearwardly of the ball in the tube having a seat on its forward end engaged with the ball opposite the first named seat, a brake system and operative connections between the system and said operating member, a bearing for the tube on the respective draft member engaged around the tube between the shoulders thereon, a sleeve revolubly engaged around the tube adjacent the said slot, said slot extending rearwardly of the forward shoulder a distance to permit longitudinal movement of the stud therein in brake-applying and releasing range, said sleeve being slotted at the forward side to aline with the slot of the tube at times to permit braking movement of the stud and ball, said slot of the sleeve having a lateral extension at its forward part forming a shoulder adapted at one position of the sleeve to engage behind the stud to prevent braking movement of the stud, means to rotate the sleeve alternately from one to the other of said two positions, and means to hold the sleeve in each position yieldable to manual force for movement to the other position.

5. In a brake device of the character described, wherein a tow element is provided with a ball headed stud and a towed element is engaged over and partly around the ball for the purpose described and wherein relative movement of the stud in the towed element is permitted and a braking device operated thereby, a ball headed stud on the tow element, a tube receiving the ball snugly and slidably, the tube being slotted to permit braking movement of the stud therein, a sleeve revolubly engaged on the tube and having a braking second slot to aline with the slot of the tube at one position of the sleeve and having a lateral slot extension from the second slot forming a shoulder to engage behind the stud and hold the latter at a non-braking position when the sleeve is rotated to a second position, a second sleeve revoluble around the first and having a braking third slot therein adapted to aline with the braking second and the slot of the tube whereby the stud may have braking movement in the three slots, the third slot having a lateral extension of much greater circumferential measurement than the extension of the second slot, a lost motion connection between the two sleeves permitting substantial movement of the second sleeve relatively to the first rotatively and a weight element fixed on the second sleeve positioned to lie at similar angles on opposite sides of dead center at respective limits of rotation of the second sleeve on the tube.

6. A combined vehicle coupler and brake operating device consisting of a draft member having a ball stud thereon, a drawn member having a socket device thereon engaged with the ball and the ball being longitudinally slidable on the drawn member, means to hold the ball yieldingly at the forward limit of its movement on the drawn member, a brake system including a reciprocatory brake operating member, and including means responsive to relative movement of the stud with respect to the drawn member to move the operating member, a lever pivoted on the drawn member operatively connected to the operating member to move the same longitudinally, and operative means on the draft element connected to the lever including a flexible linkage, and a manually releasable spring-loaded detent on the drawn member operated to engage and hold said lever in operative position.

7. The structure of claim 6 in which the drawn element includes a draft tongue having the socket device mounted at the forward end thereof, a laterally projected lever operatively connected with said first named lever, and having a handle portion extended in a position to engage the ground when the tongue end engages the ground.

8. The structure of claim 5 in which a control member is included having a longitudinally slidable and revoluble mounting on the tube, said control member having an arm substantially parallel to the tube and engaged slidably with said second sleeve, a distant operating handle on the tow element, and universal joint connections between the handle and said control member.

9. A combined coupling and brake operating device for trailer tongues and the like, consisting of a rear coupling assembly and operating unit having a hydraulic brake cylinder, a piston rod projected forwardly therefrom, a coaxial bearing sleeve spaced forwardly of the brake cylinder, a tube revoluble therein having front and rear exterior shoulder elements adapted to transmit draft and backing thrusts to the sleeve, a tow element, a ball and socket connection between the tow element and the tube, and constructed, arranged and adapted to permit longitudinal reciprocation of the ball of the connection, and means to transmit rearward thrust of the ball to the piston rod.

10. In a device of the character described, a tow element, a towed element, a headed stud on the first and a socket on the second engaged with the head of the ball retentively, and constructed and arranged for relative reciprocation of the ball longitudinally of the towed element, a brake system on the towed element and operative connections between said system and the stud device, a control member rotative on an axis longitudinally of the towed element adjacent the ball and including a part arranged to lie behind the stud at one position of the control member to prevent braking movement thereof, a lateral operating arm on said control member, a bar revoluble on the socket device concentric with the axis of rotation of the control member, and also reciprocable longitudinally thereon, said bar having a lateral arm, and a rod extended parallel to said axis and engaged slidably through said arm of the control member, and manual operative means on the tow member to rotate said bar at will, said bar being non-reciprocable on the tow member.

11. A coupling and brake operating unit for vehicles consisting of a base mounting constructed to be attached to a draft tongue or the like of a vehicle to be towed, and consisting of two L-angle members, a brake cylinder having a radial mounting flange secured between the angle members, and an operating device having a bearing sleeve concentric with the cylinder and provided with a radial flange clamped between the angle members longitudinally beyond the cylinder, a tube revoluble in the sleeve having a spherical socket segment seat at its forward part and longitudinally slotted thereadjacent to receive the stud of a ball in the tube for longitudinal sliding movement in the tube, an operating member longitudinally slidable in the tube having a second seat adapted to engage with the ball opposite the first named seat fixed in the tube rearwardly of the second seat, a spring confined between the last mentioned two seats, and a piston element projected from the cylinder and operatively connected with said operating member, said tube having shoulder elements thereon for transmitting draft and inertia forces in both directions longitudinally from and to said sleeve.

12. A coupling and brake operating unit for attachment to trailer vehicle tongues and the like, consisting of a base mounting constructed to be secured upon a tongue or the like, a bearing sleeve fixed thereon to aline longitudinally with an attached tongue and substantially horizontal, a tube revoluble in the sleeve of an interior size to receive a coupling ball therein and slotted from its forward end to receive the stud of such ball, for sliding movement of both in the tube, said tube having shoulder portions at the ends to transmit draft and inertia forces between the sleeve and tube, a seat device fixed at the forward end of the tube to receive a ball at times, an operating member mounted slidably in the tube having a socket element at its forward end to engage a ball in the tube, resilient means to hold the last named socket element in engagement with an inserted ball, and means to connect the rear end of the operating member to a brake.

13. The structure of claim 12 in which a control sleeve is revolubly engaged on the said tube, said control sleeve having a slot therein open on its forward edge adapted to aline with the slot of the tube at one position of the control sleeve, said control sleeve having a lateral extension to receive the stud of a ball at another position of the control sleeve, and weighted means revoluble on the sleeve having a lost-motion connection therewith to operate the control sleeve, said weight being positioned to lie substantially spaced from dead center at respective positions of the control sleeve and weighted means.

14. A combined vehicle coupler and brake operating device consisting of a draft member having a ball stud thereon, a drawn member having a socket device thereon engaged with the ball and the ball being longitudinally slidable on the drawn member, means to hold the ball yieldingly at the forward limit of its movement on the drawn member, a brake system including a reciprocatory brake operating member, and including means respensive to relative movement of the stud with respect to the drawn member to move the operating member, a lever pivoted on the drawn member operatively connected to the operating member to move the same longitudinally, and operative means on the draft element connected to the lever including a flexible linkage, said stud having an eye bearing at a lower part, asid linkage including at least three links one of which is a short intermediate link, said eye centrally engaged around the short link loosely for pivotal and rotatory movement of the link.

WAT W. BROWN.